United States Patent
Sutula, Jr.

(10) Patent No.: US 7,261,564 B2
(45) Date of Patent: Aug. 28, 2007

(54) HIKING STAFF, SKI POLE, OR BOAT PADDLE, WITH INTEGRATED TOPOGRAPHICAL REPRESENTATIONS OF TRAILS AND OR TERRAIN

(76) Inventor: Daniel P. Sutula, Jr., 45A Grandview Dr., Farmington, CT (US) 06032

( * ) Notice: Subject to any disclaimer, the term of this patent is extended or adjusted under 35 U.S.C. 154(b) by 882 days.

(21) Appl. No.: 10/116,444

(22) Filed: Apr. 4, 2002

(65) Prior Publication Data
US 2004/0214142 A1 Oct. 28, 2004

Related U.S. Application Data

(60) Provisional application No. 60/281,060, filed on Apr. 3, 2001.

(51) Int. Cl.
*G09B 29/00* (2006.01)
(52) U.S. Cl. ...................... 434/150; 434/247
(58) Field of Classification Search .............. 434/150, 434/151, 152, 153, 247, 253, 255; 40/904; 283/34; D19/61; 135/65, 66, 74, 75, 76
See application file for complete search history.

(56) References Cited

U.S. PATENT DOCUMENTS

| | | | | |
|---|---|---|---|---|
| 490,722 | A * | 1/1893 | Pugh | 40/317 |
| 764,301 | A * | 7/1904 | Osborn | 40/317 |
| 764,997 | A * | 7/1904 | Finch | 40/317 |
| 1,969,607 | A * | 8/1934 | Harder | 434/151 |
| 2,556,798 | A * | 6/1951 | Concordet | 434/152 |
| 2,887,791 | A * | 5/1959 | Garbutt | 434/152 |
| 4,415,106 | A * | 11/1983 | Connell et al. | 224/221 |
| 5,080,591 | A * | 1/1992 | Forsyth | 434/147 |
| 5,121,505 | A * | 6/1992 | Ludmer et al. | 2/94 |
| 5,359,797 | A * | 11/1994 | Williamson | 280/816 |
| 5,390,957 | A * | 2/1995 | Metzler | 280/819 |
| 5,686,154 | A * | 11/1997 | Brown, Jr. | 428/15 |
| 5,996,602 | A * | 12/1999 | Cato, III | 135/75 |
| 6,353,946 | B1 * | 3/2002 | Steiner | 5/121 |

FOREIGN PATENT DOCUMENTS

GB 2236889 * 10/1989

* cited by examiner

*Primary Examiner*—Kurt Fernstrom

(57) ABSTRACT

A navigational aide in the form of a physical model that may be integrated with conventional expedition equipment. The preferred embodiment comprises a hiking staff (5, 6) containing 2-D map data (3) and or 3-D topographical representations (1, 2) corresponding with specific geographic regions and or features. The 3-D surfaces may be sculpted about and along the model. Alternately, cross-sectional elevation profiles of routes may be presented in the form of a 3-D sculpted grooves or flutes along, about, and or around the shaft. A variety of configurations are presented for the purpose of maximizing the effective sculptable areas or edges, and to provide a shrouding effect for the protruding peaks that would otherwise be vulnerable to deformation and uncomfortable to grip. The 3-D elevations may be exaggerated to visually accentuate changes in elevation. Features such as trails may be represented as grooves to facilitate marking progress and position. 2-D cartographic data (7,8,9) may also be presented along with the 3-D data or alone as a mounted map. In an alternate embodiment, the invention comprises a toy for children, inspiring learning imagination and adventurous play. Several methods and materials for both computerized and conventional design and manufacturing are provided. The novel aspects of this invention may be incorporated in the original equipment manufacture, modification of existing equipment, and accessories for attachment to conventional equipment.

32 Claims, 7 Drawing Sheets

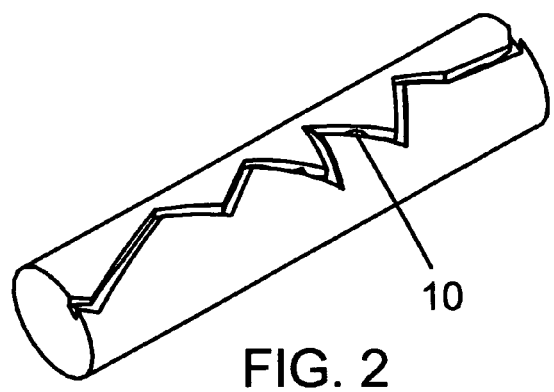
FIG. 2
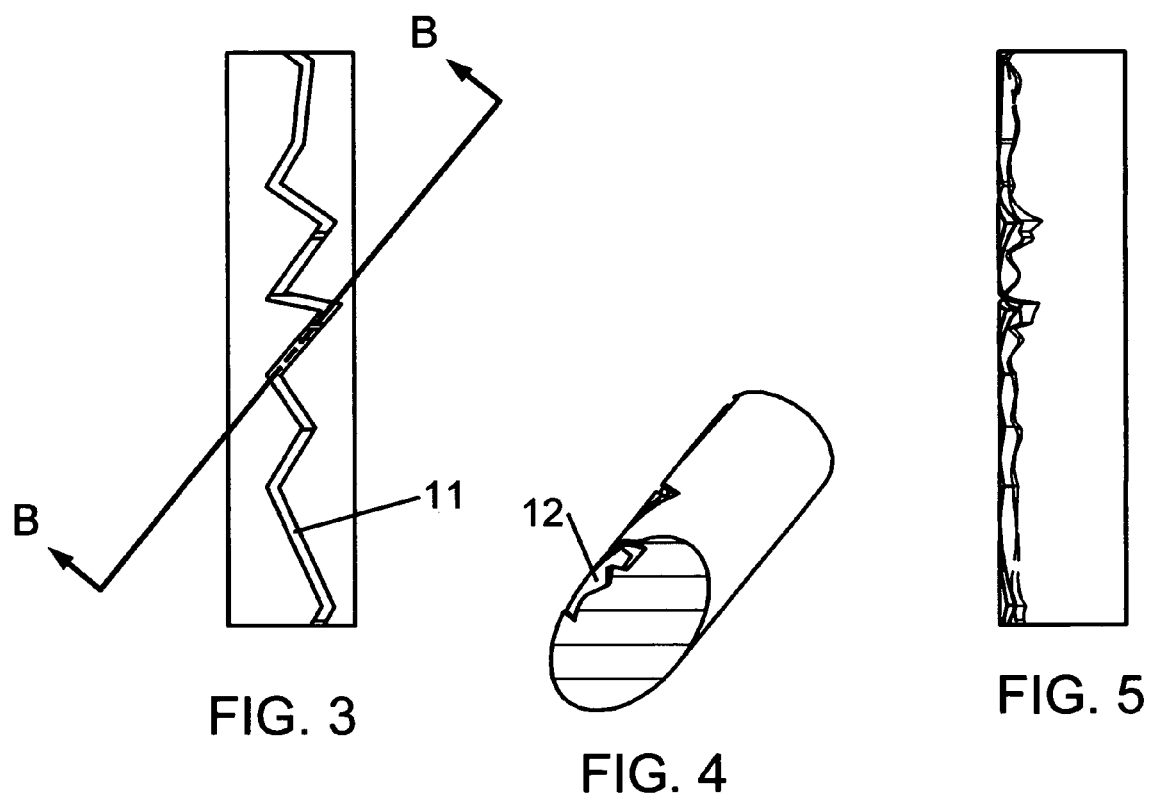
FIG. 3
FIG. 4
FIG. 5

HIKING STAFF, SKI POLE, OR BOAT PADDLE, WITH INTEGRATED TOPOGRAPHICAL REPRESENTATIONS OF TRAILS AND OR TERRAIN

The inventor hereby claims the priority filing benefits resulting from coresponding Provisional Patent Application No. 60/281,060 filed Apr. 3, 2001

BACKGROUND OF THE INVENTION

1. Field of the Invention

The present invention relates to a navigational aide in the form of physical model conveniently embodied in a generally long and slender shape, comprising three-dimensional (3-D) topographical representations and or two-dimensional (2-D) cartographic data corresponding with geographic regions and features such as mountains, rivers, shorelines, and trails. The preferred embodiment of the invention comprises the navigational aid integrated with a hiking staff. Alternate embodiments include boat paddles, ski poles, and universal attachable accessories and grips for these and other application. Another embodiment, the invention comprises a toy for children, inspiring learning imagination and adventurous play. A variety of geometric configurations are presented for the purpose of maximizing the effective sculptable areas and edges, and to provide a shrouding effect for the protruding peaks that would otherwise be vulnerable to deformation and uncomfortable to handle. The 3-D elevations may be exaggerated to visually accentuate changes in elevation. The novel aspects of this invention may be incorporated in the original equipment manufacture, modification of existing equipment, and attachments for conventional equipment.

2. Related Art

Outdoor adventures into unfamiliar territories are extremely common and adventurers are typically reliant on maps or charts for planning and navigation. For centuries, topographical maps have been the indispensable tools for travel in mountainous regions. Unfortunately, maps are somewhat inconvenient and inefficient to use, as they typically require unpacking, unfolding, refolding, and repacking. In fact, maps are universally despised for their inherent and perplexing resistance to refolding. Some navigational errors result from failures to consult a map attributable to the inconvenience.

Moreover, many people are incapable of, or experience great difficulty in comprehending 2-D graphical information or cartographic data presented on a flat map. The term cartographic data is use here to include all elements of a conventional map such as labels, legends, scales, arrows, annotation, etc. To fully comprehend the information on the map, the reader must mentally transform the non-descript 2-D data into a meaningful 3-D perspective. This process is often difficult time consuming and subject to interpretation and translation errors. Some maps provide a cross sectional representations of the elevation profiles for specific and popular trails. This information can be extremely beneficial as it assists the reader visualization of the topology of the course.

Modern "Global Positioning Systems" also known as GPS provide valuable and accurate information navigational assistance. Unfortunately, GPS systems are small computers and thus, some people are intimidated or otherwise incapable of operating them. GPS systems are ultimately reliant upon electronic components both in the GPS unit and in the satellite systems. In extreme environments basic infallible equipment is preferable over electronics. GPS systems displays are presently limited to 2-D flat screen LCDs that provide only minimal 3-D perspective.

Large format 3-D sculpture type models or dioramas of mountains, trails, rivers, oceans and shorelines of particular interest are often on display at major base camps and ports of significant interest. These models are frequently studied for correlation to 2-D maps to aide in the comprehension and visualization of the actual terrain. The typical slab type model format is an inefficient means of representing the topology of particular routes or trails due to the fact that much of the information off of the trail is generally not significant. Similarly, small-scale 3-D trail models are not particularly viable as they are volumetrically inefficient and inconvenient to pack, carry, and access.

River rafters, kayakers, and canoeists and rely on marine charts to navigate rivers and waterway. Subtle changes in topology and elevation in rivers containing waterfalls and dams may have a dramatic effect on their navigability. The changes in elevation and depth affect the flow rate and velocity of the water that can be significant factors in river boating. Moreover, rivers are often wind back and forth through areas of remarkably similarity appearance making position and progress difficult to monitor. All bodies of water also contain the added fourth dimension of sub-surface topology that is difficult to interpret from maps. Submerged obstacles can be dangerous and are often impossible to see from the surface. Paddling through whitewater rapids requires quick recognition and response to changes in the watercourse. It is often impossible or imprudent to let go of a paddle in order to access a conventional chart.

Fly fishermen are often required to hike along rivers and wade through them in pursuit of their prey. As the terrain around and within the rivers is often rough, fishermen carry wading staffs to aid in hiking and to provide probing and balance while wading in deep water. Fishermen also rely heavily on maps and charts to navigate and understand the waters in which they fish.

Skiers in general, and cross-country skiers in particular, are often required to navigate or track their position relative to terrain, trails or markers on a race course. Cold weather conditions and heavy garments such as gloves make access to maps exceedingly inconvenient.

Outdoor expedition equipment such as hiking staffs, boat paddles, and ski poles have been evolving since antiquity. Modern high technology has been applied to the design and construction of these devices providing enhanced performance with respect to ergonomic comfort, lightweight, and durability. But the basic utility of these devices has not advanced appreciably.

SUMMARY OF THE INVENTION

The present invention provides both novel and utility as it comprises a navigational aide containing 2-D map data and or 3-D topographical representations corresponding with specific geographic regions and or improvements. In the preferred embodiment of this invention the topology and improvements of the region are modeled in a manner circumscribing or wrapped around a long and generally slender format and the 2-D map geometry of the region is overlaid or superimposed thereon.

In an alternate embodiment, one or more cross-sectional elevation views of a trail are contoured into the sides along the length of the model thereby creating a fluted effect. This invention combines the functionality of 2-D maps, the visualization of 3-D topographic models, and the convenience of these features being integrated with, or attached to, tangible and required equipment. The invention offers superior durability to maps and requires no folding, unfolding or the need for special stowage. This invention is novel, useful, convenient, and aesthetically intriguing. Several methods and materials for both custom and production manufacturing are disclosed.

This invention also provides novel and compelling interest as a souvenir or memento. Custom models could be created for a particular series of expeditions or purchased as a souvenir or trophy representing prior accomplishments or as a tangible symbol of future goals. The model may be configured to permit convenient marking or inscription of ongoing personal customization. The navigational model could be subsequently bronzed, painted, engraved, inscribed, otherwise embellished. The navigational model may be displayed as a trophy or curio and could be protected by encapsulated in a transparent medium such as a cast acrylic or encased in a long glass or transparent plastic holder.

This invention could be particularly useful and practical when configured for popular expedition routes such as rivers, trails, and shorelines. For example, the invention can be modeled to represent trails such as the Appalachian Trail, waterways such as the Colorado River, or historic expeditions like that of Lewis & Clark.

This invention also has educational and inspirational value for youths interested in the study of geography, history, and outdoor sports such as hiking, boating, and skiing. For example the invention could be adopted and incorporated as part of youth scouting organizations such as the Boy Scouts and Girl Scouts of America. Moreover, the invention may have appeal as toy promoting and inspiring adventurous pretend play in children. This toy version could be easily formed of lightweight and economical plastic and could contain fictitious geographic features common to and associable with their physical environment thereby providing a linkage between their pretend world and their physical surroundings in the real world. As a toy, this invention could be incorporated with formal or informal games or competitions such as treasure hunts, and orienteering races.

Unfortunately, most paths are not straight and are often zigzagged. When a zigzag path is view from a single cross-sectional perspective, the rate of change of elevation is distorted and subsequently and dangerously misrepresented. For this reason, the side-angle cross-sectional elevation maps cannot be directly superimposed on the plan view maps. They must therefore be presented alongside the plan view in "linear scale" with respect to the trail. It is therefore necessary to provide matching reference points on both maps so that the reader can coordinate their interpretation. If the trail is substantially non-linear or zigzagged, the elevation view can become substantially longer than the plan view thereby requiring more area on the map and a greater difficulty for the reader to coordinate and comprehend.

There is an inherent problem with the representation in presentation of 3-D topology in model scale. The problem relates to the fact that in spite of our perception, the surface of planet earth is remarkably smooth. In order visualize the 3-D topology in a meaningful relationship, it is often necessary to magnify, scale or by other means accentuate the changes in elevation.

In the preferred embodiment, the elevations are contoured from an offset axis to the centerline of the shaft. As a result the vulnerable peaks of the 3-D topology intercept with a solid plane. This is a significant advantage in staffs constructed from material relatively soft and weak materials like some woods and plastics. The 3-D peaks which would otherwise be susceptible to abrasion, denting, or breakage are thus effectively shrouded by solid edges of the shaft. The resulting plane from which the mountains protrude has the effect of represent the background of a sky. Similarly, the solid straight edge provides a frame of reference that is extremely useful in the visualization of the elevation. This embodiment by forming the 3-D topology from the edged of the model the elevations intercepts the plane of a generally circular staff at varying degrees of tangency. The higher the elevation, the smaller the differential between the tangent angle and the offset intercept. As a result the length of the edge formed by the intercept is non-linearly disproportional to the elevation. The effect is that the high points appear higher and the low points appear lower. The planar surface could representing the sky would simultaneously shroud the peaks.

In addition to the 3-D topology the surfaces of the model also present a format for presenting the route or linear feature data in a wrapped 3-D perspective with 2-D information that may be superimposed onto the 3-D surfaces. 2-D information such as trail markers, paths, streams, text and labels, scale markers, GPS coordinates, lines of constant elevation, and length graduations. In fact an entire map could be applied to the 3-D contour. Suitable methods of marking include, lithography, silk-screening, pad printing, laser marking or engraving. Alternately the 2-D info could be stamped, engraved, or embossed, using high-pressure, thermal, or ultrasonic methods. In yet another embodiment, 2-D information could be printed on a shrink-wrap or adhesive label which would be subsequently shrunk-on and or bonded to the shaft surface. The 2-D data could also be incorporated in the molding surfaces by engraving or embossing the molding surfaces.

One disadvantage of externally protruding peaks is that they are vulnerable to premature abrasion or damage resulting from impact or breakage. The degradation of the peak by abrasion may even occur begin during the course of sanding or finishing the model. For this reason it is desirable that the peaks of the mountains be shrouded or made of a durable material. In yet another embodiment of the invention necessitated by the need for more durable peaks, the peaks of the mountains could be designed to receive a durable crown or insert. For example rubber, plastic, or metal tips could be molded in, bonded in or otherwise retained. The rubber mountain peaks would solve the durability and wear problems while also providing a more comfortable surface to grip. Colored inserts would also improve the aesthetic appeal of the model.

The cross section of the model could take any number of suitable cross sections. Moreover the shaft could be tapered and need not be uniform in cross section. Polygonal shapes such as triangles, squares, rectangles, pentagon, hexagons, etc could be used to increase the number of facet faces or edges for contouring. In order to maximize the amount of 3-D data recorded on a staff, the model could be fluted with several longitudinal parallel grooves. Alternately, the 3-D contour could be formed as a helix around the model. The topographical data could be formed in the root and or the peaks of a single or multiple helix thread. The 3-D topology could also be formed into an irregular wooden branch type-staff.

While hiking it is frequently important to mark a map to indicate portions of the trail that have been hiked. While this is easy to do on a 2-D map, it can be more difficult to mark along a smoothly contoured 3-D surface. Additionally markings on the convex sections of the 3-D surfaces are likely to be worn off. In order to address both the issue of ease of tractability and resistance to wear, a concave groove could be formed along or on top of the trail. The groove would be sized to accept the tip of a pen, marker, scribe or other suitable means of marking.

A hiking staff is such an important piece of equipment that most hikers already own at least one. In recent years several expensive high tech staffs have emerged on the market. These high performance staffs typically combine high strength, lightweight material with features such as adjustability of length. Many serious hikers have invested substantial sums of money on their staffs. Moreover, hiking staffs often develop sentimental value to a hiker as they travel together. In consideration of these factors, several embodiments of this invention comprise 3-D data attachments designed for being retrofit to existing conventional hiking staffs.

In the simplest form of a retrofit able 3-D data attachment would consist of a strip or tubular section of material and may be clamped, strapped, bolted, or otherwise fastened to the model. The 3-D appendage could be affixed with a hook and loop type fastener such as Velcro. The 3-D data could also be created in the form of a sleeve or shrink fit member. The 3-D sleeve could be formed from a rigid material such as plastic or as a flexible durable material such as rubber or shape memory polymers. A rubber sleeve would serve to increase the grip while providing a durable and protective representation of the topology. Alternately a flat 2-D version of the invention configured in a form similar to a bumper sticker, could be mounted on a staff, pole or paddle by means of a pressure sensitive adhesive. In yet another option, Alternately the 2-D map could be printed on tubular heat-shrinkable polymer film and subsequently shrunk to the surface of the equipment. And lastly a 2-D map could be mounted on the equipment by means of a transparent polymeric retainer clip, which would serve to enclose and protect the map.

In another aspect of the invention targeting the retrofit market, a machining service could be established for custom machining of 3-D trail geometry into their favorite wooden hiking staffs. Coincident with the emerging GPS technology, 3-D staffs could conceivably be machined based on series of data collected from a hikers GPS for a virtual recreation of an uncharted course.

The 3-D topology could also be designed as an interchangeable insert and the shaft of the equipment designed to receive said insert. An extruded or machined staff profile could have a retaining groove or means to receive and retain the inserts. Aluminum is one such material that is easily extrudable in almost any cross-section. Aluminum, titanium, or magnesium an alloys thereof all suitable candidate for this invention as they are light, strong, tough, economical, and relatively corrosion resistant making it a good material for the frame of a staff intended to receive inserted 3-D profiles. This interchangeable insert concept enables the invention to be adaptable to various regions. The inserts could themselves become collectable with interest and values as souvenirs or trophies. The interchangeable insert concept also enables the inserts to be borrowed, exchange or rented. The inserts themselves could even be disposable and could even be dispensed trailside by a vending machine.

The 3-D data profile need not be fully contoured. A so-called 2½d object is defined as a shape having a constant cross-sectional profile and a uniform thickness. This type of shape could be blanked, stamped, laser, or plasma cut from sheet stock. Compared to true 3-D processes, 2½d processes tend to be relatively simple, fast and economical.

The technology to accurately design and manufacture the complex geometry of this invention is largely facilitated by the Computer Aided Design (CAD) and Computer Aided Manufacturing (CAM) technology. CAD technology can be used to transform topographic data available from sources such as maps, the USGS, and GPS coordinates and transform the data into a format suitable for incorporation in a hiking staff. Ideally, the entire design process could be done via a computer modeling techniques. Realistically, a combination of conventional model making and high-tech computer sculpting would probably be employed to expedite the process. For example, CAD models could be created by scanning, digitizing or otherwise "reverse engineering" data from existing sources such as conventional 3-D models. CAD models can be subsequently used to program CNC machinery for production or fabrication of tooling.

The field of Rapid Prototyping (RP) is recently developed field of CAD/CAM technology that may be particularly instrumental in the efficient production of this invention. RP techniques are typically based on using CAD data to create a product or tooling. Methods such as stereolithography, fused deposition modeling, or selective laser sintering could be particularly convenient and economical for creating complex highly detailed 3-D geometry required for this invention.

Computer Numerical Controlled (CNC) routing is a process that is particularly well suited to cutting the 3-D contours from a solid material such as wood. A CNC router with a rotary indexing $4^{th}$ axis could be used to mill the pattern all the way around perimeter of the model. A five-axis mill would enable machining complex shapes and undercuts. CNC routing tools such as ball mills can be used to approximate smooth contours while the corners of flat end mill could be used to create a stair step effect corresponding with elevation. Pantographic or copy-milling methods may be employed to duplicate facsimile parts from a master model. While routing is likely to be the most practical cutting method, the 3-D contours may also be milled or swarf cut with an abrasive or non-abrasive water-jet cutter, a laser, edm, sanding, or grinding. In fact the manufacturing methods are comparable to those used in manufacturing camshafts.

Another method of achieving a visually aesthetic appeal also provides a visual indication of elevation. The model could be cut from a multi-colored laminated composite material. For example, changing the color of the laminating stock at periodic wrap increments while forming a rolled up wound or braided composite staff. As a result, after subsequent machining, to depths representing varying elevations the colored layers would be exposed indicating lines indicating constant radii corresponding with levels of constant elevation. These contour lines would be internal to the stock material and would therefore be impervious to degradation or wear. In a less desirable option, the model could be cut from conventionally laminated plywood comprised of flat planar layers.

Special wood products are available that can be treated softened and brought into a condition which permits them to be permanently reformed. The process typically involves the application of heat and moisture to soften the wood to the point that it will yield under forming pressure. Alternately, there are chemical treatments that have been engineered for the purpose of changing the phase of the wood and subsequently curing the wood in a polymerization reaction. These products would enable a 3-D hiking staff to be formed from a wood based material.

Injection molding is one of the most cost efficient methods of manufacturing complex shapes such as a 3-D topographical staff. Unfortunately, there are limitations associated with the molding. In general the molded part geometries are limited to those that permit the mold to be opened and not locked shut by means of undercut geometry. Undercut geometry limits the complexity of the injection moldable geometry. While it is possible to overcome this process limitation with complex mold action, tooling for such a process is often cost prohibitive.

In contrast hollow blow molded parts are a bit more forgiving with respect to molding mild undercuts. In one embodiment of this invention, the 3-D geometry of the shell could be formed into a blow molded tubular shell that would subsequently be filled with a suitable casting material.

A flexible mold is perhaps the most practical method of forming complex parts with significant undercut regions especially for low volume production. Flexible molds are typically cast around a master pattern using elastomers such as silicone rubber.

A suitably strong and durable staff could be efficiently produced from tubular metal in a process such as hydroforming or explosive forming wherein a small diameter ductile metal tube is internally pressurized and expanded to fill a complex 3-D cavity. Alternately, a larger diameter tube could be externally shrunk down or formed over a mandrel. Suitable processes again include hydroforming, explosive forming, and Magneforming wherein electrical energy is use to generate the forming force.

Investment casting is another option well suited to forming complex parts such as a 3-D hiking staff. Investment casting involves forming a frangible and disposable shell around a soluble master pattern. The master pattern can be melted or otherwise dissolved out of shell. The shell is subsequently filled with a casting material. After casting, the shell can be broken or blasted off exposing the finished part.

In yet another embodiment and method of constructing this invention a 3-D topographic model involves forming the 3-D data in a 3-D but relatively flat contoured matt. The flexible matt could then wrapped around and attached to the equipment shaft.

In the preferred embodiment of the invention a flat map is projected and wrapped around the circumference of the shaft. If or when a trail changes directions with more significance than the shaft, it may be necessary to cut, reorient, and splice the map along a given length segment of the shaft. Upon reorienting the map, it is necessary to provide additional references features such as arrows indicating north or toward other distinguishable features. Moreover, of the relative width of the transverse zigzags of the trail exceed the width of the effective circumference of the shaft; the transverse scale of the 3-D model may be manipulated to fit. Alternately, the model may need to be segmented into segments presented discontinuous to each other along the staff. One side of the trail groove may be relieved or cut away in order to provide a line of sight to the shrouded path.

The format, in which the 3-D geometry of this invention is best presented, depends on both the topology and the users requirements. For example trails or rivers that are relatively straight may be best presented in a straight grooved or flute type configuration. In contrast zigzagging trails may be most suitably represented in a format that is wrapped around the shaft.

BRIEF DESCRIPTION OF THE DRAWINGS

The methods, advantages and features of this invention will become more clearly apparent from the following description of several embodiments of the invention, given as non-restrictive examples only and represented in the accompanying drawings in which:

FIG. 2 is a partial perspective view of a hiking staff in accordance with another embodiment of the invention in which a 3-D groove representing the trail has been mapped and wrapped onto the surface of the staff with the groove depth representing the elevation and contour of the trail;

FIG. 3 is a front view of the segment of the hiking staff shown in FIG. 2;

FIG. 4 is a cross-sectional view taken along line B-B of FIG. 3;

FIG. 5 is a side view of the segment of the hiking staff shown in FIG. 2;

DETAILED DESCRIPTION OF THE INVENTION AND PREFFERED EMBODIMENTS THEREOF

Figure 1:
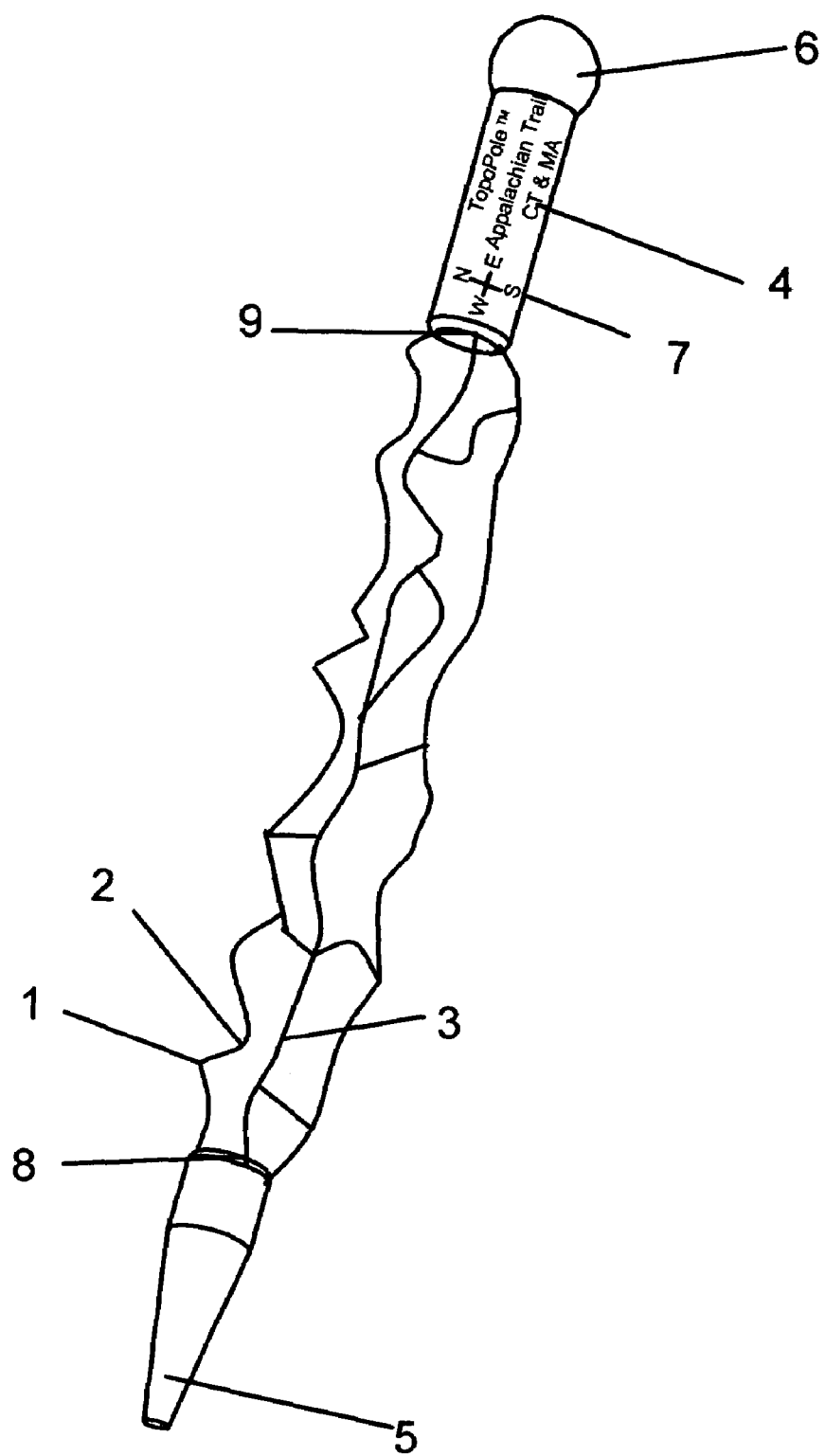
FIG. 1 is a perspective view of a hiking staff, the exterior of which features 3-D contoured topology superimposed with 2-D trail and map data in accordance with the preferred embodiment of this invention.
Figure 7:
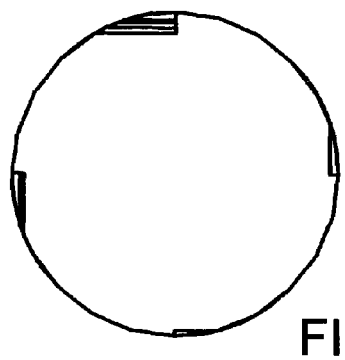
FIG. 7 is an axial view of the staff segment shown in FIG. 6.
Figure 8:
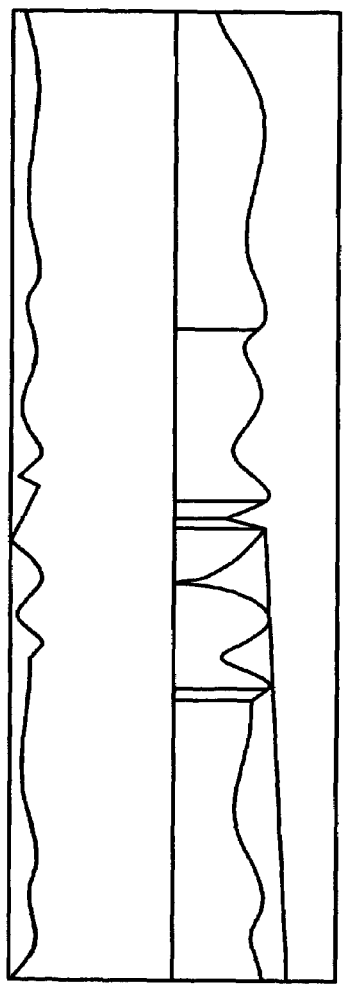
FIG. 8 is a front view of the staff segment shown in FIG. 6.

FIG. 1 shows a perspective view of a hiking staff, the exterior of which features 3-D contoured topology superimposed with 2-D trail and map data in accordance with the preferred embodiment of this invention. The highest elevations or mountain peaks are represented as protrusions 1. In contrast the lowest elevations are 2 represented by valleys 2. Trails 3, natural features, and pertinent information may be superimposed onto the 3-D surfaces. Pertinent statistics 4 may also be labeled on the staff. Other portions of the staff such as the point 5 and handle 6 may be of conventional form. Other information such as a directional index 7 and start and stop labels 8 and 9 may be included.

FIG. 2 shows a hiking staff in accordance with another embodiment of the invention in which a 3-D groove 10 representing the trail has been mapped and wrapped onto the surface of the staff with the groove depth representing the elevation and contour of the trail. FIG. 3 shows the trail groove 11 and defines the cross-sectional view shown in FIG. 4. The topology of the trail 12 is represented by the depths of the groove and can be seen from the side view FIG. 5.

Figure 6:
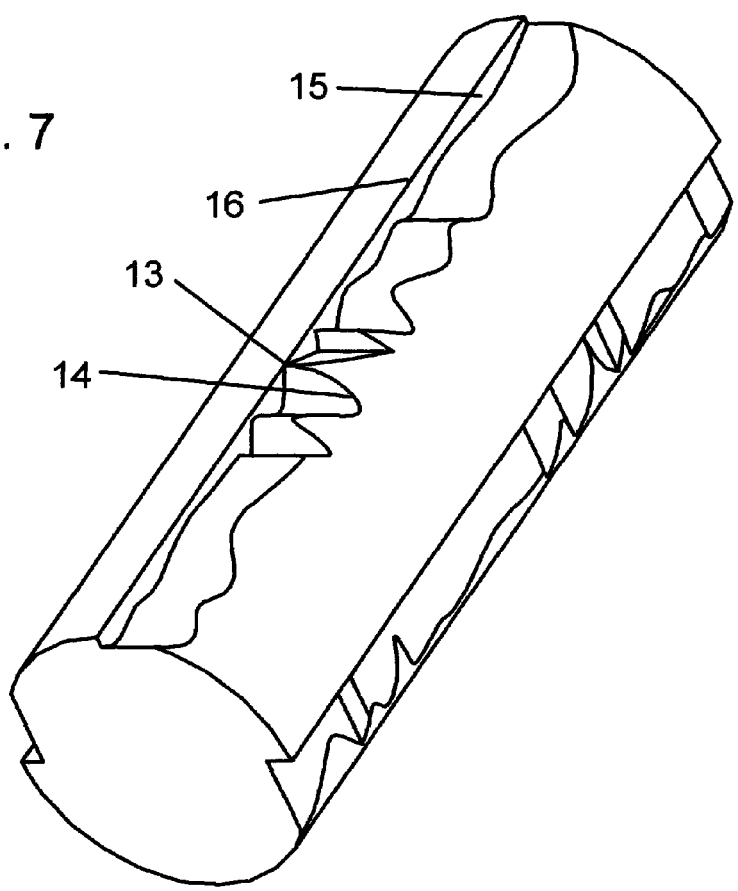
FIG. 6 is a partial perspective view of a segment of a hiking staff in accordance with another embodiment of the invention, in which 3-D flutes representing the elevation profiles of trails have been offset and formed into the sides of the staff.

FIG. 6 shows staff in which 3-D flutes representing the elevation profiles of trails have been offset and formed into the sides of the staff. The peaks of the profiles 13 are furthest from the center. The edges formed by the intersection of the profile and the tangencies with the outer surface 14 are exaggerated to improve visibility. The form of the profile can be seen against the background surface 15, while the outside edge 16 shrouds and protects the peaks of the profile and provides a frame of reference for the elevation in true scale.

Figure 9:
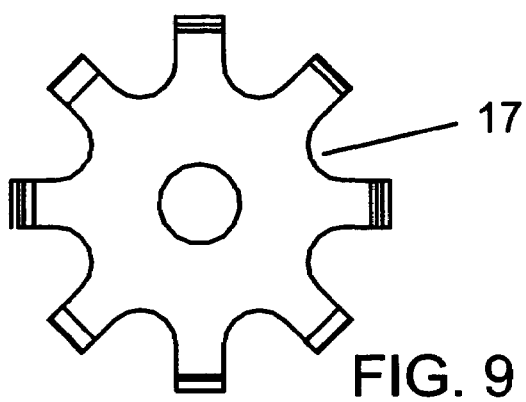
FIG. 9 is an axial view of a partial segment of a hiking staff in accordance with another embodiment of the invention, in which the multiple edges of the fluted staff have been formed to represent the elevation contours of trails.

FIG. 9 shows a segment of a hiking staff in accordance with another embodiment of the invention, in which the multiple edges of the staff are contoured between the multiple flutes 17.

Figure 10:
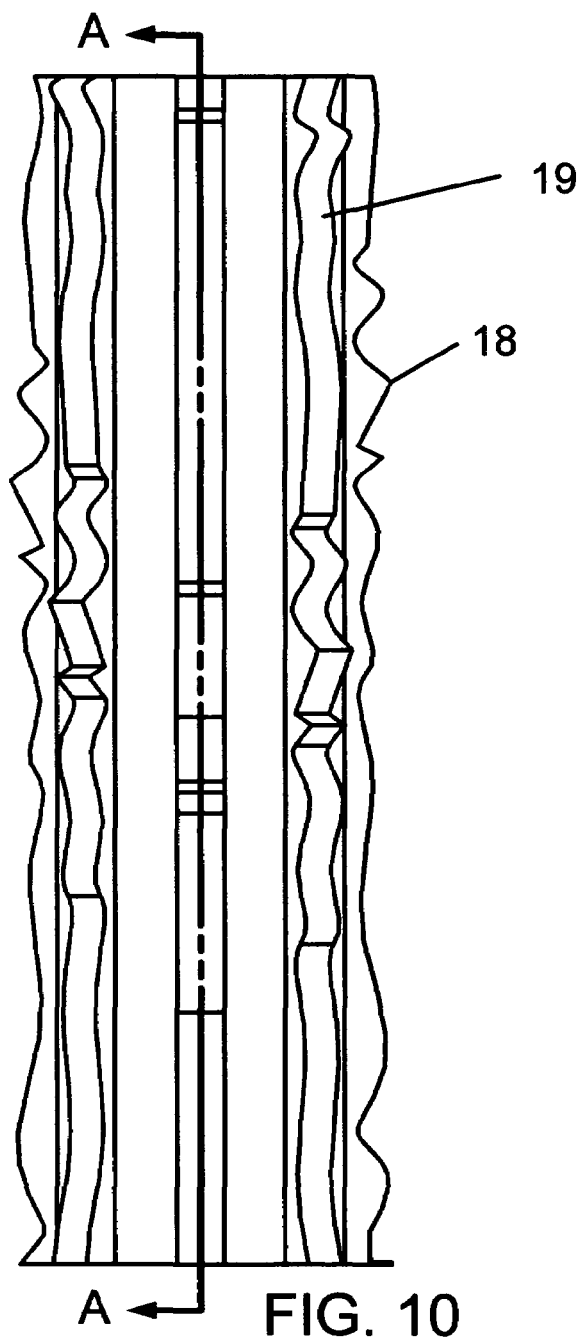
FIG. 10 is a front view of the staff segment shown in FIG. 9.
Figure 11:
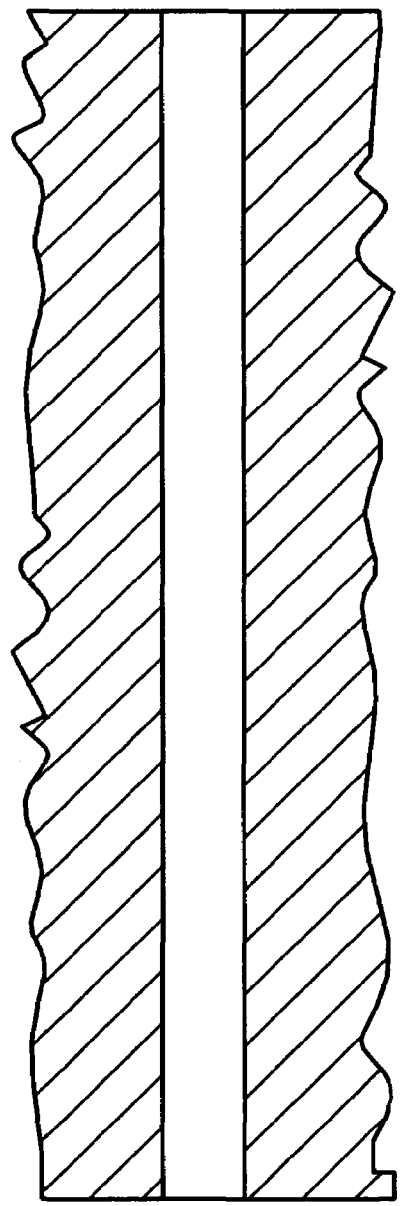
FIG. 11 is a cross-sectional view taken along line A-A of FIG. 10.

FIG. 10 shows the peaks 18 of the contoured profiles, along with the individually contoured surfaces 19. FIG. 11 shows a cross-sectional view taken along line A-A of FIG. 10 wherein the different profiles of the different trails are illustrated.

Figure 12:
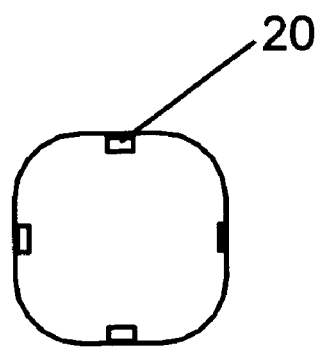
FIG. 12 is an axial view of a segment of a hiking staff in accordance with another embodiment of the invention, wherein 3-D fluted grooves have been formed into and along the sides of the staff at depths representing the elevation contours of the trails.
Figure 13:
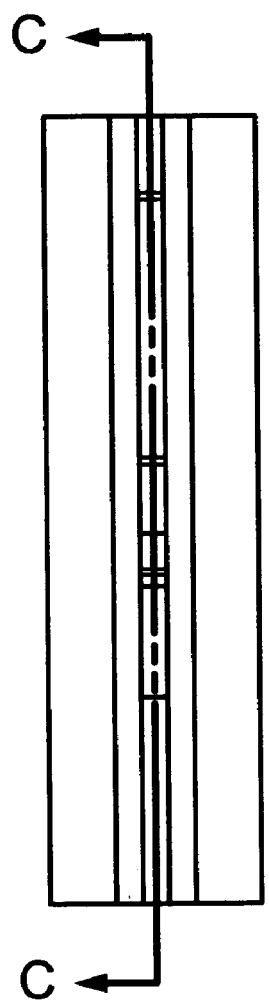
FIG. 13 is a front view of the staff segment shown in FIG. 12.
Figure 14:
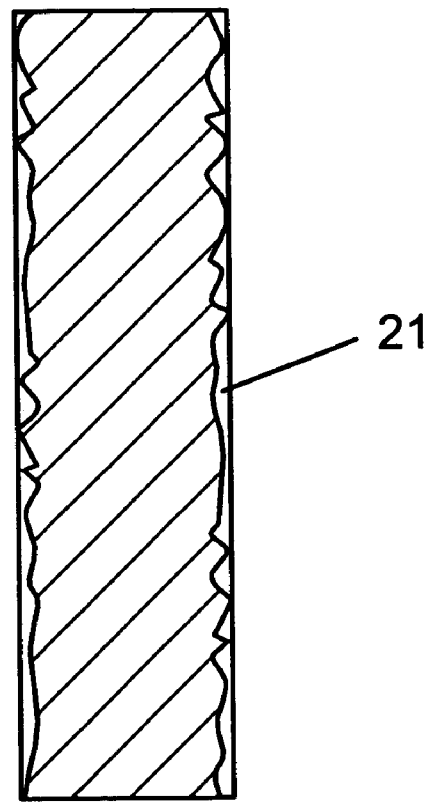
FIG. 14 is a cross-sectional view taken along line C-C of FIG. 13.
Figure 17:
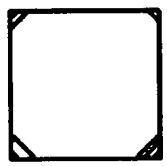
FIG. 17 is an axial view of the staff segment shown in FIG. 15.

FIG. 12 shows a recessed groove 20, the depth of which represents the contour of the trail. FIG. 14 again illustrates the different contours, which can be presented in each individual groove 21.

Figure 15:
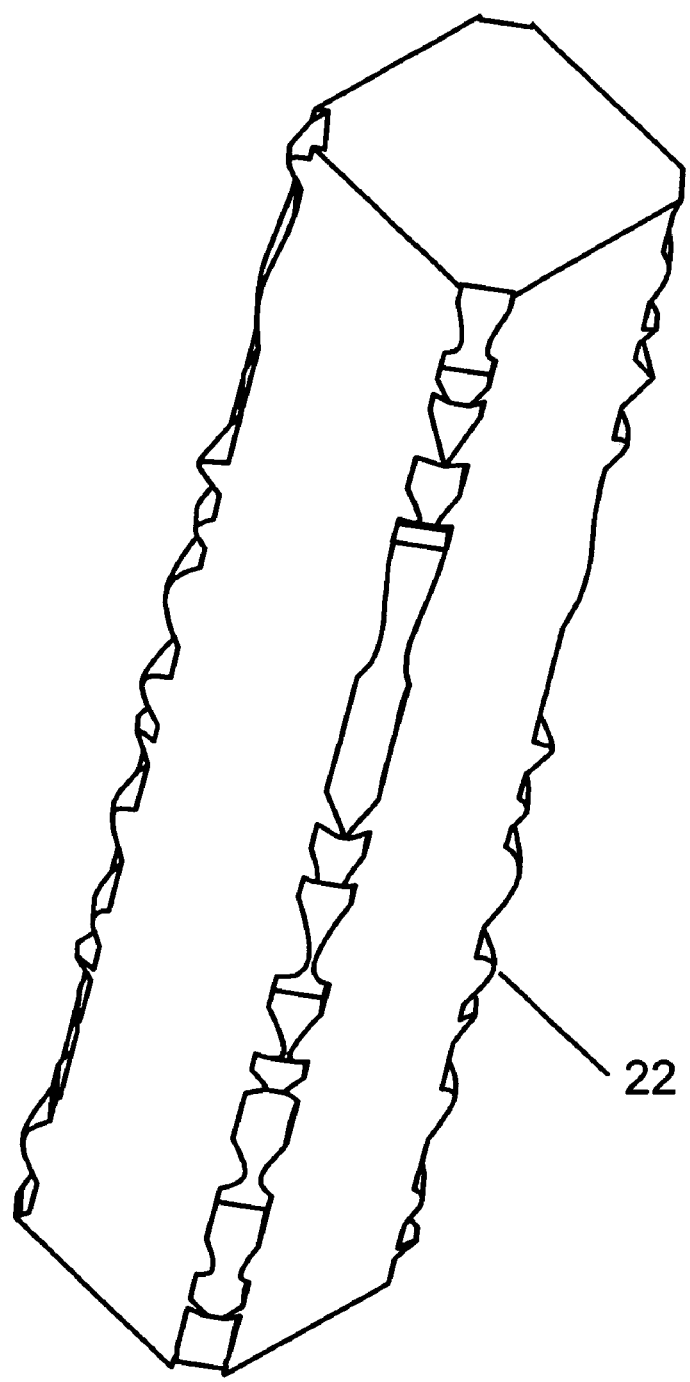
FIG. 15 is an axial view of a section of a hiking staff in accordance with another embodiment of the invention, wherein the corners of the polygonal staff have been formed in 3-D profiles representing the elevation contour of the trail.
Figure 16:
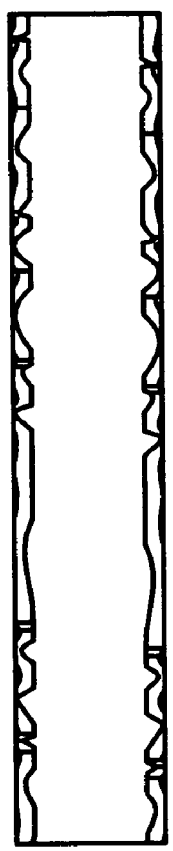
FIG. 16 is a front view of the staff segment shown in FIG. 15.

FIG. 15 shows a polygon, the edges 22 of which have contoured in 3-D to represent a trail.

Figure 18:
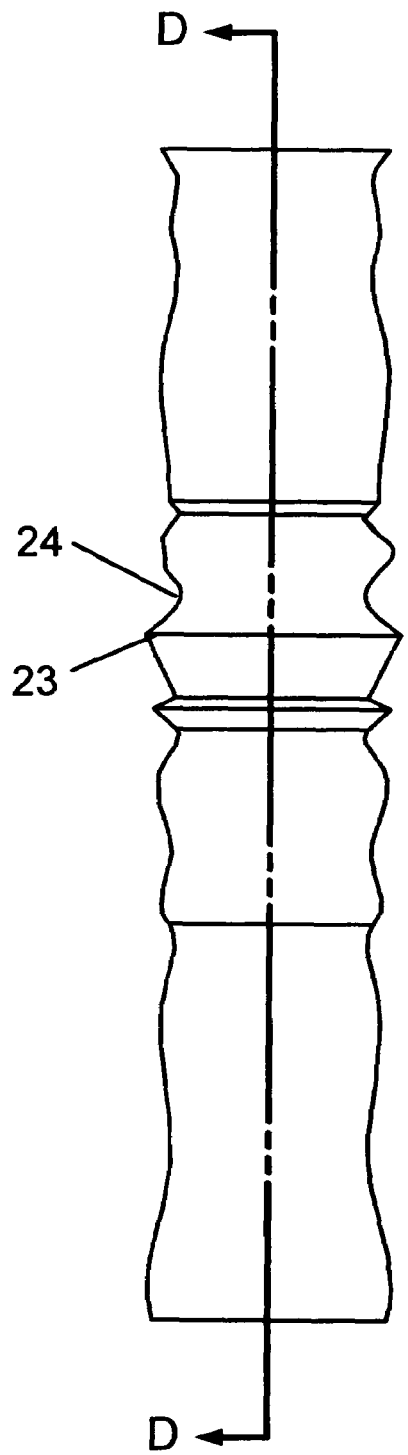
FIG. 18 is a front view of a segment of a hiking staff in accordance with another embodiment of the invention, wherein the 3-D profile has been symmetrically turned into the outer diameter of the staff with the resulting radii thereby representing the elevation contours of the trails.
Figure 19:
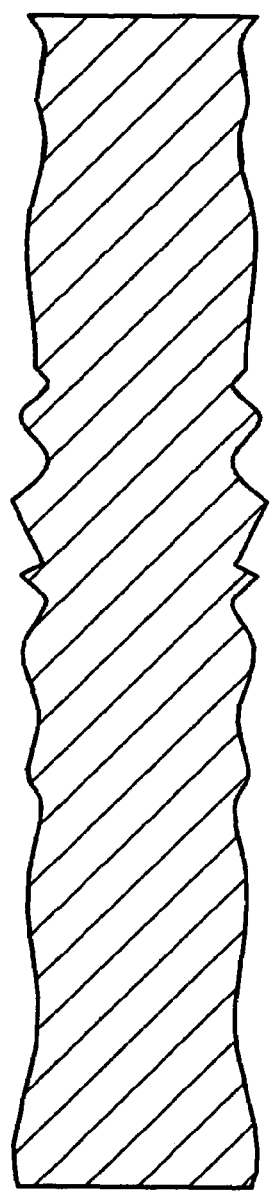
FIG. 19 is a cross-sectional view taken along line D-D of FIG. 18.
Figure 20:
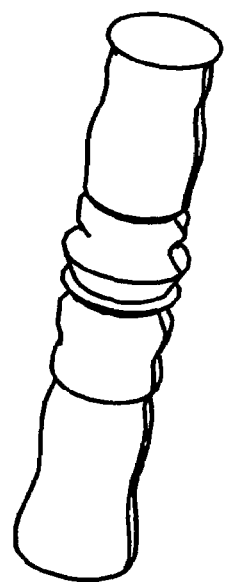
FIG. 20 is a perspective view of the staff segment shown in FIG. 18.

FIG. 18 shows a hiking staff in wherein the 3-D profile has been symmetrically turned into the outer diameter of the staff resulting in a spindle like form. The large diameters represent the mountains 23 while smaller diameters 24 represent the valleys. FIG. 19 illustrates the symmetrical nature of this embodiment that has the advantage of being producible on a lathe.

FIG. 15 shows a polygon, the edges 22 of which have contoured in 3-D to represent a trail.

FIG. 18 shows a hiking staff in wherein the 3-D profile has been symmetrically turned into the outer diameter of the staff resulting in a spindle like form. The large diameters represent the mountains 23 while smaller diameters 24 represent the valleys. FIG. 19 illustrates the symmetrical nature of this embodiment that has the advantage of being producible on a lathe.

I claim:

1. A navigational aide in the form of a physical model for enhanced visualization of geographic terrain and routes comprising;
   a geometric shape providing a large visible exterior area in the form of a tubular map printed on a heat shrinkable polymer, and;
   a means for integration with conventional equipment comprising a friction fit induced by shrinking the polymer sleeve by means of the application of heat, and;
   2-Dimensional cartographic information illustrated thereon.

2. Navigational equipment with integrated topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
      a means for integration with or adaptation to a hiking pole.

3. The navigational equipment of claim 2 wherein the geometric shape comprises the form of a long slender object.

4. The navigational equipment of claim 2 wherein the geometric shape comprises the form of a long slender object further comprising;
   a plurality of polygonal faces and resulting edges to maximize the visible area.

5. The navigational equipment of claim 2 wherein the geometric shape comprises the form of a long slender object further comprising;
   one or more flutes or grooves and resulting edges to maximize the visible area.

6. The navigational equipment of claim 2 wherein the 3-Dimensional representations of the geographic topology further comprises;
   representations of the elevation profiles of particular hiking routes configured suitably along, around, and/or about, the exterior of the model.

7. The navigational equipment of claim 2 wherein the 3-Dimensional representations of geographic topology further comprise;
   sculpted surfaces representing the topology configured along, around, and/or about the exterior of the model.

8. The navigational equipment of claim 2 wherein the 3-Dimensional representations of topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
      a means for integration with, or adaptation to a conventional hiking pole.

9. Navigational equipment with integrated topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
      a means for integration with or adaptation to a ski pole.

10. The navigational equipment of claim 9 wherein the geometric shape comprises the form of a long slender object.

11. The navigational equipment of claim 9 wherein the geometric shape comprises the form of a long slender object further comprising;
   a plurality of polygonal faces and resulting edges to maximize the visible area.

12. The navigational equipment of claim 9 wherein the geometric shape comprises the form of a long slender object further comprising;
   one or more flutes or grooves and resulting edges to maximize the visible area.

13. The navigational equipment of claim 9 wherein the 3-Dimensional representations of the geographic topology further comprise;
   representations of the elevation profiles of particular hiking routes configured suitably along, around, and/or about, the exterior of the model.

14. The navigational equipment of claim 9 wherein the 3-Dimensional representations of geographic topology further comprise;
   sculpted surfaces representing the topology configured along, around, and/or about the exterior of the model.

15. The navigational equipment of claim 9 wherein the 3-Dimensional representations of topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
   a means for integration with, or adaptation to a conventional ski pole.

16. Navigational equipment with integrated topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
   a means for integration with or adaptation to a boat paddle.

17. The navigational equipment of claim 16 wherein the geometric shape comprises the form of a long slender object.

18. The navigational equipment of claim 16 wherein the geometric shape comprises the form of a long slender object further comprising;
   a plurality of polygonal faces and resulting edges to maximize the visible area.

19. The navigational equipment of claim 16 wherein the geometric shape comprises the form of a long slender object further comprising;
   one or more flutes or grooves and resulting edges to maximize the visible area.

20. The navigational equipment of claim 16 wherein the 3-Dimensional representations of the geographic topology further comprise;
   representations of the elevation profiles of particular hiking routes configured suitably along, around, and/or about, the exterior of the model.

21. The navigational equipment of claim 16 wherein the 3-Dimensional representations of geographic topology further comprise;
   sculpted surfaces representing the topology configured along, around, and/or about the exterior of the model.

22. The navigational equipment of claim 16 wherein the 3-Dimensional representations of topographical and/or route representations for enhanced visualization and navigation of geographic terrain and/or routes comprising;
   a geometric shape providing a large visible exterior and;
      3-Dimensional representations of geographic topology formed on the exterior areas; and
      2-Dimensional cartographic information contained thereon; and
   a means for integration with, or adaptation to a conventional ski pole.

23. The navigational equipment of claim 16 wherein the model is integrated or adapted to a boat paddle.

24. The navigational equipment of claim 2 wherein the means for integration comprises a mountable accessory capable of being physically attached to the hiking pole.

25. The navigational equipment of claim 2 wherein the means for integration comprises a mountable accessory in the form a conformal sleeve or wrap.

26. The navigational equipment of claim 2 wherein the means for integration comprises;
   equipment specifically designed with a receiving means to accept interchangeable inserts; and
   interchangeable inserts comprising geographical data designed to be mountable on said equipment.

27. The navigational equipment of claim 9 wherein the means for integration comprises a mountable accessory capable of being physically attached to the hiking pole.

28. The navigational equipment of claim 9 wherein the means for integration comprises a mountable accessory in the form a conformal sleeve or wrap.

29. The navigational equipment of claim 9 wherein the means for integration comprises;
   equipment specifically designed with a receiving means to accept interchangeable inserts; and
   interchangeable inserts comprising geographical data designed to be mountable on said equipment.

30. The navigational equipment of claim 16 wherein the means for integration comprises a mountable accessory capable of being physically attached to the hiking pole.

31. The navigational equipment of claim 16 wherein the means for integration comprises a mountable accessory in the form a conformal sleeve or wrap.

32. The navigational equipment of claim 16 wherein the means for integration comprises;
   equipment specifically designed with a receiving means to accept interchangeable inserts; and
   interchangeable inserts comprising geographical data designed to be mountable on said equipment.

* * * * *